United States Patent [19]
Hogan et al.

[11] Patent Number: 5,109,467
[45] Date of Patent: Apr. 28, 1992

[54] INTERCONNECT CABINET FOR OPTICAL FIBERS

[75] Inventors: Joseph R. Hogan, Middletown; George R. Steenton, Howell; Anthony L. Nieves, Belmar, all of N.J.

[73] Assignee: Keptel, Inc., Tinton Falls, N.J.

[21] Appl. No.: 661,212

[22] Filed: Feb. 27, 1991

[51] Int. Cl.[5] .......................... G02B 6/00; G02B 6/36
[52] U.S. Cl. .................................................. 385/135
[58] Field of Search .......................... 350/96.20–96.22

[56] References Cited

U.S. PATENT DOCUMENTS

| | | | |
|---|---|---|---|
| 4,717,231 | 1/1988 | Dewez et al. | 350/96.21 X |
| 4,792,203 | 12/1988 | Nelson et al. | 350/96.22 X |
| 4,971,421 | 11/1990 | Ori | 350/96.22 X |
| 4,976,510 | 12/1990 | Davila et al. | 350/96.21 X |

OTHER PUBLICATIONS

Cable Termination Enclosures, Ditel Inc., Hickory, NC, 2 pp. 14 & 15.
Fiber In-Building Panel, ADC Telecomunications Inc. © 1988, pp. 5–7.

Primary Examiner—Akm E. Ullah
Attorney, Agent, or Firm—R. Gale Rhodes, Jr.

[57] ABSTRACT

An optical fiber interconnect cabinet for interconnecting incoming telephone company optical fibers with outgoing customer optical fibers either by adapters mounted on an internal bulkhead or by adapters mounted on an external cabinet wall; a pair of stepped, multi-level radiuses are mounted internally of cabinet and provide two storage levels for storing the optical fibers.

6 Claims, 7 Drawing Sheets

INTERCONNECT CABINET FOR OPTICAL FIBERS

BACKGROUND OF THE INVENTION

This invention relates to an interconnect cabinet including a plurality of adapters, sometimes referred to in the art as couplers, for interconnecting telephone company optical fibers with subscriber or customer optical fibers.

Numerous cabinets are known to the prior art for interconnecting telephone company optical fibers with customer optical fibers. While these prior art cabinets perform the fundamental purpose of interconnecting telephone company optical fibers with customer optical fibers reasonably well, they are not as convenient to use as may be desired nor do they provide flexibility in permitting either the internal interconnection of telephone company optical fibers and customer optical fibers or the external interconnection, i.e. along an external cabinet wall, of telephone company optical fibers and subscriber optical fibers.

Accordingly, there exists a need in the art for a new and improved interconnect cabinet which is more convenient to use than those known to the prior art and which provides the flexibility of permitting either internal interconnection between telephone company optical fibers and customer optical fibers or the external interconnection, i.e. along an external wall, of telephone company optical fibers and customer optical fibers.

SUMMARY OF THE INVENTION

It is the primary object of the present invention to satisfy the above-mentioned need in the optical fiber interconnect cabinet art.

An interconnect cabinet satisfying the foregoing need and embodying the present invention may include a base on which is mounted a pair of opposed, spaced apart, stepped multi-level radiuses providing at least two storage levels for storing optical fibers with one level being elevated with respect to and spaced inwardly of the other level, an internal bulkhead provided with a plurality of adapters for interconnecting incoming telephone company optical fibers with outgoing customer optical fibers and which may further include a plurality of external bulkheads provided with a plurality of adapters for interconnecting incoming telephone company optical fibers with outgoing customer optical fibers and permitting such interconnection to be made along an external wall of the cabinet.

DESCRIPTION OF THE PREFERRED EMBODIMENTS

Figure 1:
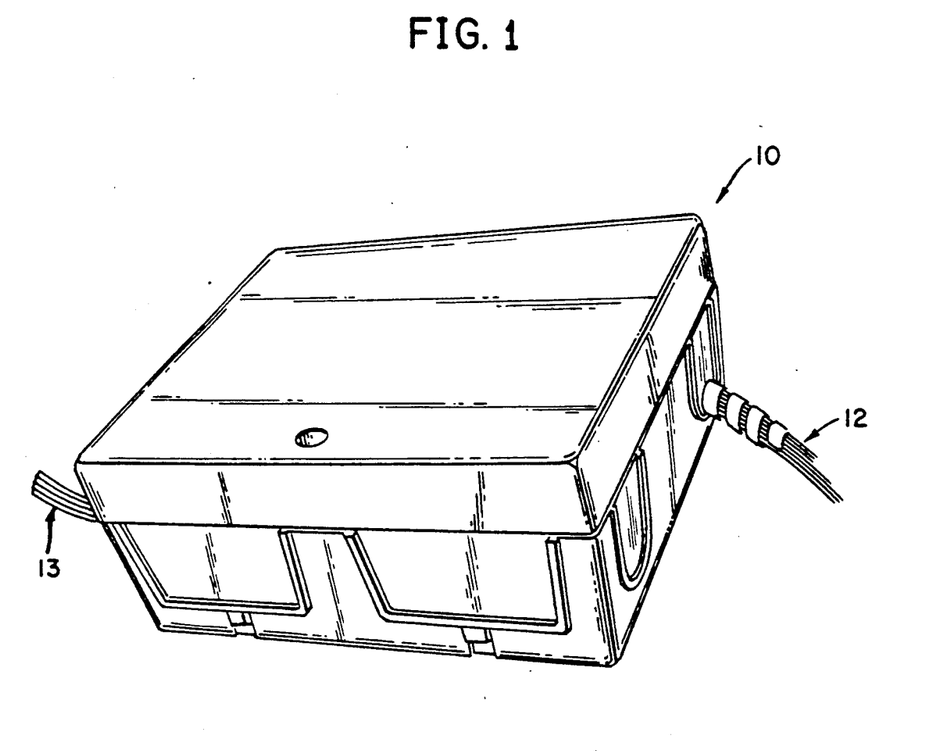
FIG. 1 is a perspective view of an optical fiber interconnect cabinet embodying the present invention and showing the cabinet in the closed position.

In FIG. 1, a fiber optic interconnect cabinet embodying the present invention is shown in perspective and indicated by general numerical designation 10. Generally, it will be understood that the cabinet 10 is for interconnecting incoming telephone company optical fibers indicated by general numerical designation 12 with outgoing customer optical fibers indicated by general numerical designation 13.

Figure 2:
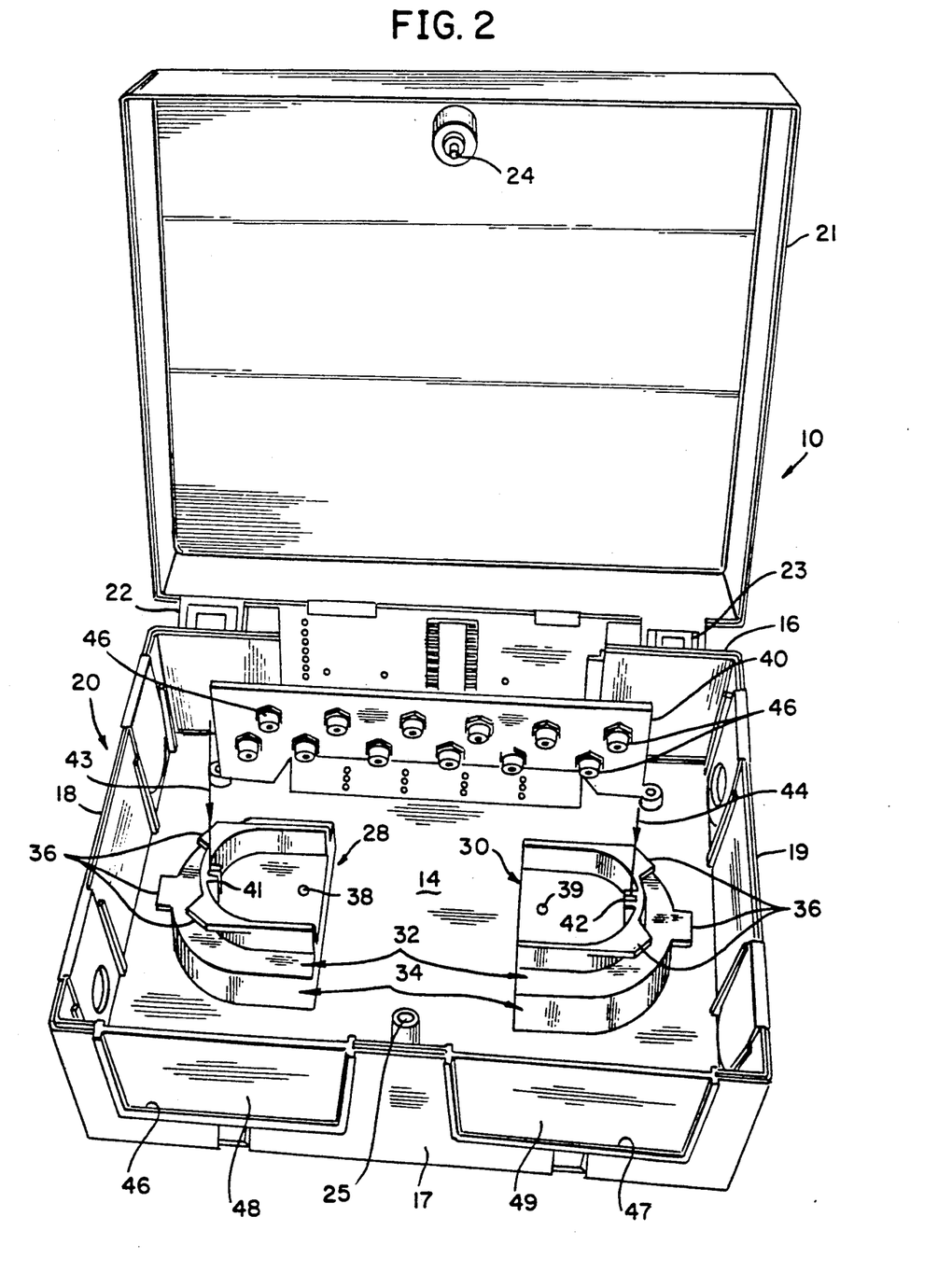
FIG. 2 is a perspective view of the optical fiber interconnect cabinet of the present invention showing the cover in the open position and illustrating, diagrammatically, the assembly of an internal bulkhead to the cabinet.
Figure 3:
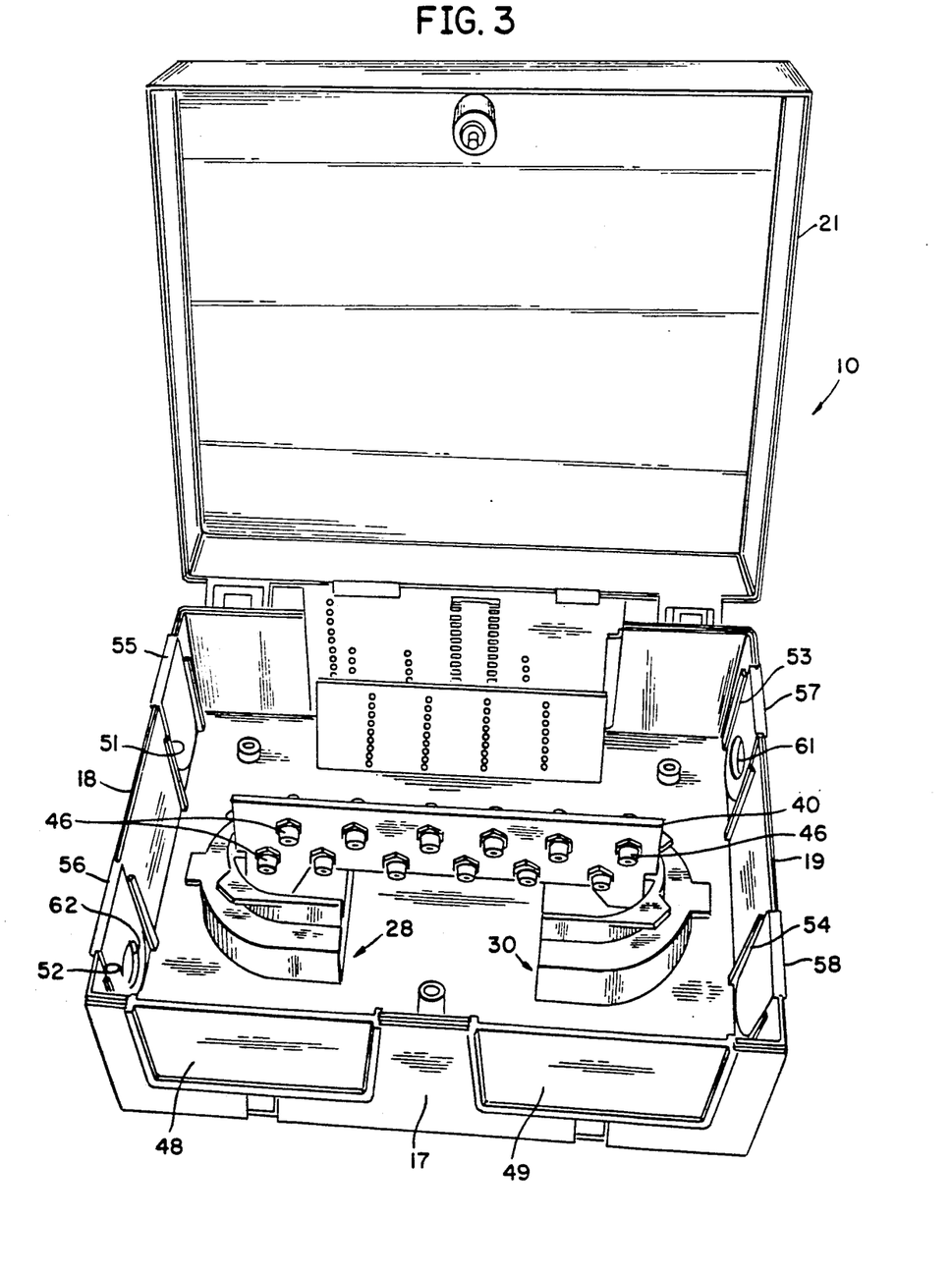
FIG. 3 is a perspective view of the optical fiber interconnect cabinet of the present invention showing the cover in the open position and illustrating the cabinet in condition for receiving and internally interconnecting incoming telephone company optical fibers with outgoing customer optical fibers.
Figure 4:
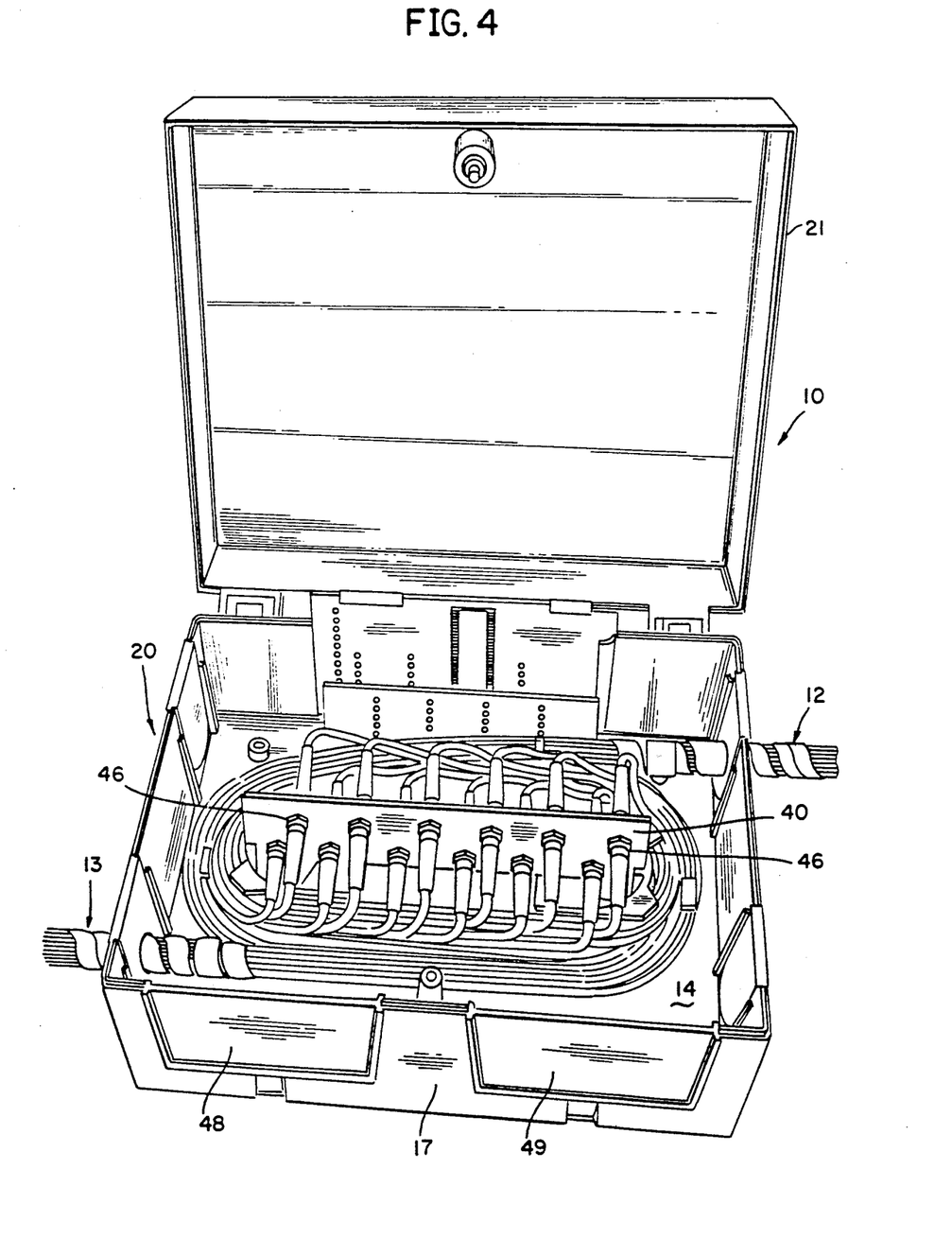
FIG. 4 is a perspective view of the optical fiber interconnect cabinet of the present invention showing the cover in the open position and illustrating the internal interconnection of incoming telephone company optical fibers and outgoing customer optical fibers.
Figure 5:
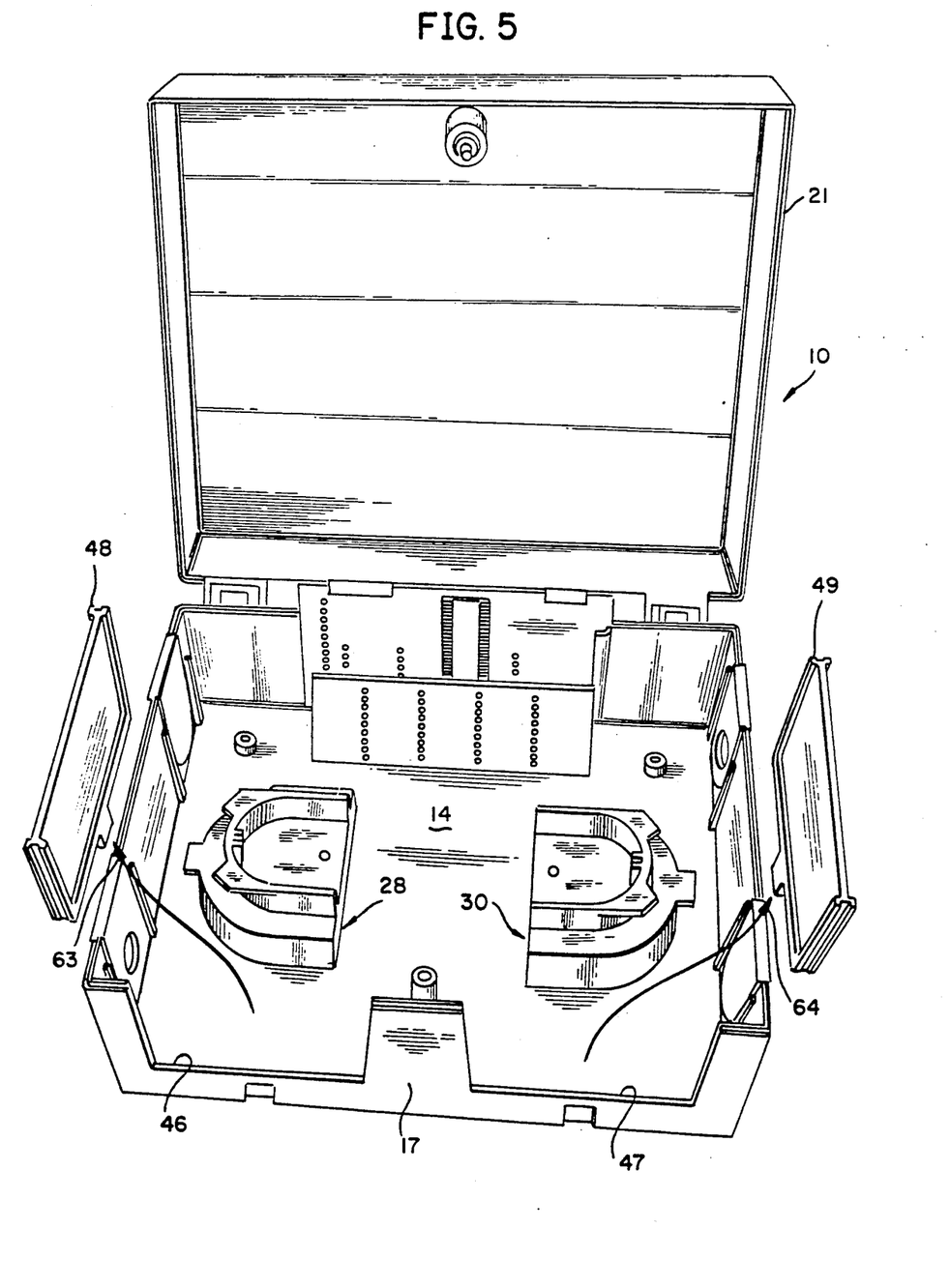
FIG. 5 is a perspective view of the optical fiber interconnect cabinet of the present invention showing the cover in the open position and illustrating, diagrammatically, the removal of blank external bulkheads preparatory to the receipt and assembly to the cabinet of external bulkheads provided with a plurality of adapters with interconnecting incoming telephone company optical fibers and outgoing customer optical fibers.
Figure 6:
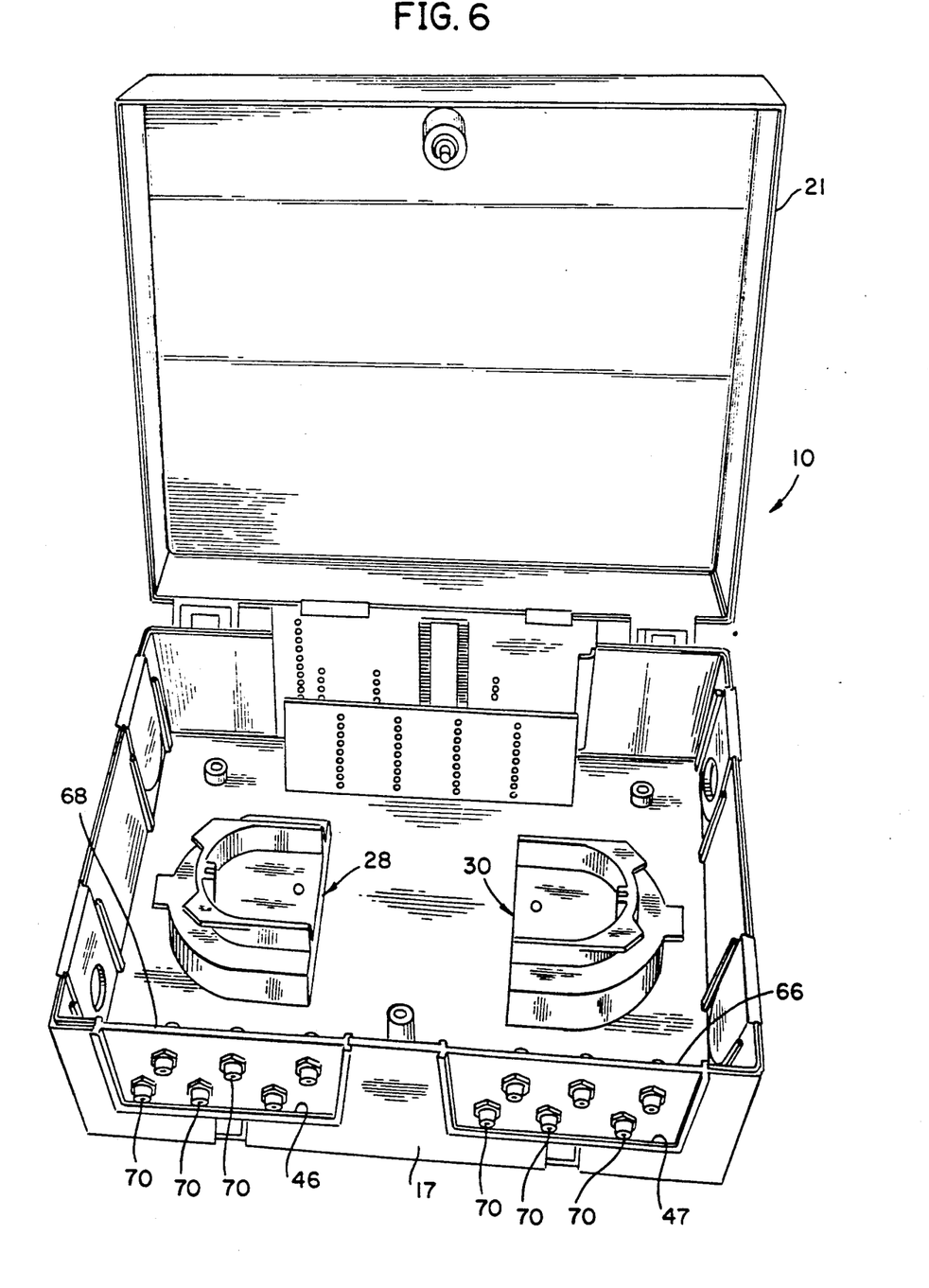
FIG. 6 is a perspective view of the optical fiber interconnect cabinet of the present invention showing the cover in the open position and showing the cabinet ready for the receipt of incoming telephone company optical fibers and the interconnection along an external cabinet wall of the incoming telephone company optical fibers with outgoing customer optical fibers.
Figure 7:
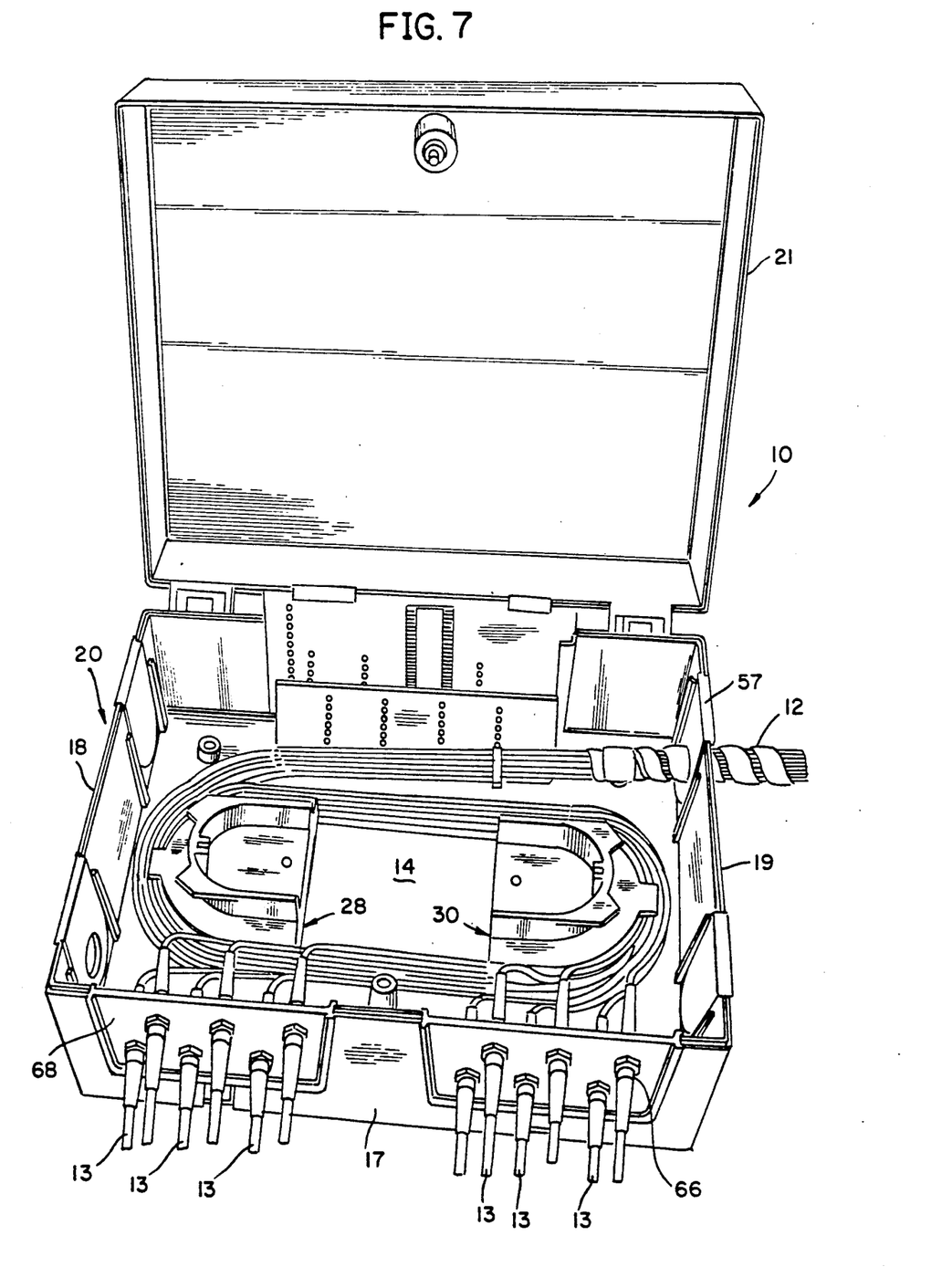
FIG. 7 is a perspective view of the optical fiber interconnect cabinet of the present invention showing the cover in the open position and illustrating the interconnection along an external cabinet wall of the incoming telephone company optical fibers with outgoing customer optical fibers.

Referring first generally to FIGS. 2, 3 and 4 and to FIGS. 5, 6 and 7, it will be understood that FIGS. 2, 3 and 4 illustrate a feature or embodiment of the optical fiber interconnect cabinet 10 of the present invention wherein the interconnections between the incoming telephone company optical fibers 12 and the outgoing customer optical fibers 13 are made internally of the cabinet 10 by adapters 45 provided on internal bulkhead 40, and that FIGS. 5, 6 and 7 illustrate a feature or embodiment of the optical fiber interconnect cabinet 10 of the present invention wherein the interconnections between the incoming telephone company optical fibers 12 and the outgoing customer optical fibers 13 are made along an external cabinet wall 17 of the cabinet 10 by adapters 70 provided on external bulkheads 68 and 66. In the embodiment of FIGS. 2, 3 and 4, the internal bulkhead 40 provided with the adapters 45 and the blank external bulkheads 48 and 49 are utilized. In the embodiment of FIGS. 5, 6 and 7, the internal bulkhead 40 is removed and external bulkheads 66 and 68 provided with adapters 70 are utilized.

As may be better understood by reference to FIG. 2, the cabinet 10 may include a base 14, a pair of opposed side walls 16 and 17, and a pair of opposed end walls 18 and 19. The side walls 16 and 17 and end walls 18 and 19 collectively comprise a wall indicated by general numerical designation 20 which circumscribes the base 14 and extends upwardly therefrom. The cabinet 10 may further include a cover 21 mounted pivotally to the side wall 16 by a pair of hinges 22 and 23. The cover 21 may be provided with a rotatable, threaded fastener 24 for threadedly engaging a threaded hole 25 upon the cover 21 being pivoted closed over the wall 20 and base 14. The head (not shown) of the rotatable threaded fastener 24 may be, for example, a 216 hex wrench or a pin-in-hex wrench not commonly found among the general population whereby a security feature is provided to the cabinet 10. This security feature, in particular, permits rotation of the threaded member 24 and unfastening of the cover 21 by telephone company personnel provided with the aforementioned screwdriver or wrench of an uncommon size or shape. Referring further to FIG. 2, it will be understood that the cabinet 10 of the present invention may include a pair of opposed, spaced apart, stepped multi-level radiuses indicated respectively by general numerical designation 28 and 30. By being stepped, the radiuses 28 and 30 provide upper and lower storage levels indicated by general numerical designations 32 and 34. As shown in FIG. 4, the incoming telephone company optical fibers 12 and the outgoing customer optical fibers 13 are shown wrapped around the radiuses 28 and 30 and stored in the upper and lower storage levels 32 and 34. It will be still further understood that the radiuses 28 and 30, FIG. 2, may be provided with outwardly extending members or ears 36 for facilitating storage of the telephone company and customer optical fibers. The radiuses 28 and 30 may be suitably secured or fastened to the base 14 by suitable threaded fasteners 38 and 39.

The cabinet 10, FIG. 2, may further include an internal bulkhead 40 for being removably received in a pair of opposed slots 41 and 42 provided respectively in the radiuses 28 and 30 as indicated by the downwardly extending arrows 43 and 44. The internal bulkhead 40 may be provided with a plurality of adapters 45 for interconnecting the incoming telephone company optical fibers with the outgoing customer optical fibers. Sidewall 17 may be provided with slots 46 and 47 for removably receiving blank external bulkheads 48 and 49 which are used when the internal bulkhead 40 and adapters 45 are being used.

FIG. 3 shows the internal bulkhead 40 assembled to the radiuses 28 and 30 and further shows the cabinet 10 in the ready condition for receiving the incoming telephone company optical fibers 12 and the outgoing customer optical fibers 13. As may be best understood from FIG. 3, the end walls 18 and 19 may be provided respectively with slots 51 and 52 and 53 and 54 for receiving grommets 55 and 56 and 57 and 58. By providing opposed slots and grommets 51 and 55 and 53 and 57 in opposed side walls 18 and 19, the incoming telephone company optical fibers may be brought into either end of the optical fiber interconnect cabinet 10. Similarly, by providing opposed slots and grommets 52 and 56 and 54 and 58 in opposed end walls 18 and 19, the incoming customer optical fibers may be brought into either end of the optical fiber interconnect cabinet 10. This permits increased flexibility in interconnecting the incoming telephone company optical fibers and the outgoing customer optical fibers regardless of the directions in which the incoming telephone company optical fibers and outgoing customer optical fibers approach the optical fiber interconnect cabinet 10. As is further shown in FIG. 3, the grommet 57 may be provided with an opening 62 for admitting the incoming telephone company optical fibers 12 (FIG. 4) into the cabinet 10 and for sealingly engaging the incoming telephone company optical fibers 12. Similarly, FIG. 3, the grommet 56 may be provided with an opening 62 for admitting the customer optical fibers 13 (FIG. 4) into the cabinet 10 and for sealingly engaging the outgoing customer optical fibers 13.

Referring now to FIG. 4, this FIG. shows the incoming telephone company optical fibers 12 and the outgoing customer optical fibers 13 admitted into the cabinet 10 and shown wrapped around the radiuses 28 and 29 (FIG. 3) and stored at the upper and lower storage levels 32 and 34 (FIG. 2) provided by the opposed radiuses 28 and 30. This figure also shows the incoming telephone company optical fibers 12 and the outgoing customer optical fibers 13 interconnected by the adapters 45 provided on the internal bulkhead 40. The cover 21 may now be pivoted and fastened over the side wall 20 and base 14 in the manner described above.

Referring now to FIG. 5, this FIG. illustrates the cabinet 10 with the internal bulkhead 40 (FIGS. 2, 3 and 4) removed and with the blank external bulkheads 48 and 49 shown being removed from the slots 46 and 47 as indicated by the arrows 63 and 64. FIG. 6 shows external bulkheads 66 and 68 removably received within the slots 46 and 47. The external bulkheads 66 and 68 are provided with adapters 70 for providing interconnections between the incoming telephone company optical fibers 12 and the outgoing customer optical fibers 13 along the external cabinet side wall 17 as shown in detail in FIG. 7. As is also illustrated in FIG. 7, the incoming telephone company optical fibers 12 are admitted into the cabinet 10 through the opening 61 (FIG. 3) provided in the grommet 7 and wrapped and stored around the radiuses 28 and 30. The cover 21 may now be pivoted and fastened closed over the side wall 20 and base 14 of the cabinet 10.

It will be further understood that many variations and modifications may be made in the present invention without departing from the spirit and the scope thereof.

What is claimed is:

1. Interconnect cabinet for optical fibers, comprising:
   cabinet means including a base;
   mounting means provided on said base generally centrally thereof, said mounting means including a pair of opposed, spaced apart, stepped multi-level radiuses providing at least first and second levels for storing said optical fibers, said second level being elevated with respect to and spaced inwardly of said first level; and
   internal bulkhead adapter means mounted on said mounting means and provided with a plurality of adapters for interconnecting a plurality of incoming telephone company optical fibers with a plurality of outgoing customer optical fibers.

2. The interconnect cabinet according to claim 1 wherein said cabinet further comprises wall means circumscribing and extending upwardly from said base, said wall means provided with a plurality of slots for receiving a plurality of grommets provided with openings for sealingly receiving said telephone company optical fibers and said customer optical fibers.

3. Interconnect cabinet means for optical fibers, comprising:
   cabinet means including a base;
   a pair of opposed, spaced apart stepped multi-level radiuses providing at least first and second levels for storing incoming telephone company optical fibers;
   wall means circumscribing and extending upwardly from said base and said wall means provided with a plurality of slots for removably receiving a plurality of external bulkhead adapter means; and a plurality of external bulkhead adapter means for being removably received in said slots, said plurality of external bulkhead adapter means provided with a plurality of adapters for interconnecting said incoming telephone company optical fibers with a plurality of customer optical fibers.

4. The interconnect cabinet means according to claim 3 wherein said wall is provided with at least one additional slot for receiving a grommet provided with an opening for sealingly receiving said incoming telephone company optical fibers.

5. Interconnect cabinet means for optical fibers, comprising:

cabinet means including a base, a wall circumscribing and extending upwardly from said base, and a cover mounted pivotally to said wall and for being closed and fastened over said wall and base;

a pair of opposed, spaced apart, stepped, multi-level radiuses mounted on said base, said radiuses providing at least first and second levels for storing optical fibers, said second level being elevated with respect to and displaced inwardly of said first level;

an internal bulkhead provided with a plurality of adapters for interconnecting incoming telephone company optical fibers with outgoing subscriber optical fibers and said radiuses provided with spaced apart, opposed slots for removably receiving said internal bulkhead;

a plurality of blank external bulkheads, said wall provided with a plurality of slots for removably receiving said plurality of blank external bulkheads upon said internal bulkhead being utilized to interconnect said incoming telephone company optical fibers with said outgoing customer optical fibers; and a plurality of external bulkhead adapter means provided with a plurality of adapters for interconnecting said incoming telephone company optical fibers with said outgoing customer optical fibers, and said plurality of external bulkhead adapter means for being removably received in said slots upon said plurality of external blank bulkheads being removed from said slots and upon said internal bulkhead adapter means not being utilized to interconnect said incoming telephone company optical fibers with said outgoing customer optical fibers.

6. The interconnect cabinet according to claim 5 wherein said wall is further provided with at least one additional slot for receiving a grommet provided with an opening for sealingly receiving said plurality of incoming telephone company optical fibers.

* * * * *